US007014483B2

(12) United States Patent
Brooks et al.

(10) Patent No.: US 7,014,483 B2
(45) Date of Patent: Mar. 21, 2006

(54) METHODS AND APPARATUS FOR CONNECTING A HOST DEVICE AND A PRINTER

(75) Inventors: Donald E. Brooks, Ithaca, NY (US); Robert F. Bullivant, Interlaken, NY (US)

(73) Assignee: TransAct Technologies Incorporated, Wallingord, CT (US)

(*) Notice: Subject to any disclaimer, the term of this patent is extended or adjusted under 35 U.S.C. 154(b) by 0 days.

(21) Appl. No.: 10/884,449

(22) Filed: Jul. 2, 2004

(65) Prior Publication Data

US 2006/0003605 A1 Jan. 5, 2006

(51) Int. Cl.
*H01R 13/62* (2006.01)

(52) U.S. Cl. ...................... 439/157; 439/159; 361/727; 312/223.1

(58) Field of Classification Search ........ 439/157–162, 439/296, 374, 40; 361/726–727, 685; 400/693; 312/223.1
See application file for complete search history.

(56) References Cited

U.S. PATENT DOCUMENTS 3,014,160 A * 12/1961 Brogden ..................... 361/727
5,299,944 A 4/1994 Larabell et al. ............. 439/157
5,381,315 A * 1/1995 Hamaguchi et al. ........ 361/727
5,460,441 A * 10/1995 Hastings et al. ............ 312/298
5,779,496 A 7/1998 Bolinger et al. ............ 439/377
6,315,587 B1 11/2001 Ikemoto et al. ............. 439/159
2003/0156177 A1 8/2003 Nishikawa et al. ......... 347/102
2004/0132529 A1 7/2004 Mkrtchyan et al. ........... 463/29

OTHER PUBLICATIONS

Specification for MOLEX Drawer Connector, part No. 44499-0075, Sep. 13, 1994 (3 pages).

* cited by examiner

*Primary Examiner*—Michael C. Zarroli
(74) *Attorney, Agent, or Firm*—Lipsitz & McAllister, LLC

(57) ABSTRACT

An electrical device is disposed on a base for sliding movement between first and second ends of the base. The electrical device includes a first electrical connector configured to connect to a connector board disposed on the base. The connector board includes a second electrical connector configured to mate with the first electrical connector. The connector board can move between the first and second ends. A cable electrically couples the second connector to a signal. The cable is configured to maintain electrical connectivity between the signal and the second connector as the connector board slides between the first and second ends. The electrical device can removably connect to the connector board via the first and second connectors. The connector board can slide along with the electrical device to provide electrical connectivity of the signal to the electrical device as the electrical device slides between the first and second ends.

24 Claims, 4 Drawing Sheets

METHODS AND APPARATUS FOR CONNECTING A HOST DEVICE AND A PRINTER

BACKGROUND

The present invention relates to peripherals for gaming machines, ticket dispensing terminals and the like, and more particularly to a hot disconnect peripheral such as a sliding drawer printer.

Sliding drawer printers are particularly well suited for use in gaming machines, vending machines, point-of-sale (POS) terminals, transportation and entertainment ticket machines, and the like.

Sliding drawer printers are useful in a variety of applications. One such application is to print coded tickets or vouchers used in lottery terminals, slot machines and other self-service wagering apparatus.

Various printer systems have been proposed for use in self-service terminals, such as for cashless gaming systems used, e.g., at casinos and racetracks. In such systems, a ticket (alternatively referred to herein as a "voucher") is provided to the gaming patron for use instead of, e.g., tokens, cash, debit cards and credit cards. It is well known to use tokens in gambling casinos. For example, in a typical gaming machine environment, a player inserts coins or tokens and plays the game. When the player is finished and has a winning cash amount, a cash-out button is pressed and the appropriate number of coins or tokens is dispensed in a cash out bin. It is awkward, however, to deal with such tokens and to cash them in before leaving the casino.

The coins or tokens can be replaced with the printed voucher. The printed voucher is produced by a printer disposed in the cabinet of the self-service terminal. The printer requires the attention of staff in order to maintain the printer and refresh the paper supply of the printer.

The gaming machines are provided with a cabinet that houses the printer and other gaming machine components. The contents of the cabinet are considered to be sensitive and susceptible to tampering. As a result, the protection of the components inside the cabinet is of a paramount importance. Many features and procedures are enacted to ensure the protection of the gaming machine and the contents of the cabinet.

As a result, the printer is housed in the cabinet and provided with a high level of protection. Since the printer requires maintenance by staff, the printer must be accessed from the outside of the cabinet. The cabinet is thus, opened exposing components of the gaming machine.

There are two main reasons for opening the cabinet doors to access the printer, one is to replenish an empty stack of fan-fold tickets, or two, to replace the inner chassis of the printer due to a printer problem.

The sliding drawer printer is capable of being slidably translated from a stored position inside the cabinet to a position outside the cabinet, known as being racked out. The printer is more easily accessed by an operator in the racked out position. Components of the printer can be accessed without the need to completely remove the printer from the cabinet, and prolong the downtime of the gaming machine.

The inner printer chassis is still attached by a cable to the outer chassis in the racked out position. The cable transmits both electrical power and communications to the inner printer chassis from the host gaming machine. The transmission of electrical power and communications information is performed either directly or through a communications printed circuit board mounted in the outer chassis. The printer indicators, such as light emitting diodes (LED), still operate in the racked out position. An operator can feed tickets into the printer mechanism in the racked out position.

If there is a problem identified with the printer, (e.g., indication from and ERROR LED) it is often the case that an operator will totally replace the entire inner printer chassis assembly with a replacement inner printer chassis. The process of replacement includes racking out the inner chassis past outer stops. The interconnect cable is unplugged manually by the operator to allow the inner chassis to be completely removed. Installing a new inner printer chassis requires the operator to shut down the gaming machine before reconnecting the interconnect cable. Most often operators do not shut down the gaming machine before connecting the interconnect cable. As a result of reconnecting the interconnect cable of the gaming machine to the inner printer chassis while having full power on the gaming machine failures occur. Failures occur in the interconnect cable, communications components, the communications printed circuit board, and even the main controller printed circuit board.

Thus, when maintenance is required the inherent design of the sliding drawer printer coupled with operator carelessness causes an increased wear on the electrical connectors and electronics and can lead to more frequent system failures.

What is needed in the art is a sliding drawer printer that can be serviced and completely removed from a cabinet while ensuring proper electrical connection with the gaming machine when reinserted.

SUMMARY

The present disclosure is directed toward an exemplary apparatus for maintaining an electrical connection to a withdrawn electrical device. The electrical device can comprise a printer. The electrical device is disposed on a base for sliding movement between a first end and a second end of the base. The electrical device includes a first electrical connector. The first electrical connector is configured to connect to a connector board disposed on the base. The connector board includes a second electrical connector configured to mate with the first electrical connector. The connector board is configured to move between the first end and the second end. A cable electrically couples the second connector to at least one signal. The cable is configured to maintain electrical connectivity between the at least one signal and the second connector as the connector board slides between the first end and the second end. The electrical device is adapted to removably connect to the connector board via the first and second connectors. The connector board is configured to slide along with the electrical device to provide electrical connectivity of the signal to the electrical device as the electrical device slides between the first and second ends.

In an exemplary embodiment, the printer is partially removable from the base and is configured to maintain electrical connectivity with the signal. In an alternate embodiment the signal comprises electrical power or control signals for a printer and the printer is a gaming device printer. The connector board is coupled to a slider bracket. The slider bracket is configured to slidably translate along the base between the first and second ends along slide rails mounted in the base. The electrical device is configured to align the first electrical connector into electrical connection with the second electrical connector. The electrical device is configured to partially translate and to be partially withdrawn from the base exposing components coupled to the electrical device. The base includes a receiver extending between the first end and the second end of the base. The receiver is configured to receive the electrical device and support translation of the electrical device. The cable comprises a flexible cable and is extendable from the first end to the second end.

In another exemplary embodiment, the electronic device can be a sliding drawer printer including a sliding drawer housing adapted for a cabinet. The cabinet is configured to restrict access to the printer disposed on a drawer demountably coupled to the sliding drawer housing. The sliding drawer housing includes a housing front end and a housing rear end. A base is formed in the sliding drawer housing and extends from the housing front end to the housing rear end. An electronics board is coupled to the sliding drawer housing proximate the housing rear end. A connector board is coupled to a slider bracket. The slider bracket is slidably coupled to the base and is configured to translate between the housing rear end and the housing front end. A connector cable is coupled to the electronics board and the connector board. The connector cable is configured to maintain electrical connectivity between the electronics board and the connector board throughout translation of the drawer between the housing rear end and the housing front end. A control board is operatively associated with the printer. The control board is configured to demountably couple with the connector board and electrically connect the electronics board with the printer throughout the translation of the drawer.

In exemplary embodiments, the base includes slide rails mounted in the base. The slide rails are configured to support translation of the slider bracket. The drawer is configured to translate distally from the housing rear end such that the printer is exposed for access. The electrical connectivity is maintained between the printer and the electronics board. The printer is accessible for the insertion of paper and for the removal of paper while maintaining electrical connectivity between the printer and the electronics board. The electronics board communicates electrical power and control signals between the printer and a gaming machine. The drawer is configured to completely decouple from the sliding drawer housing. In an exemplary embodiment, at least one bracket latch is configured to demountably couple the slider bracket to the base for alignment of the connector board and the control board responsive to reinsertion of the printer into the sliding drawer housing.

A method for maintaining electrical connectivity to an electrical device is disclosed. The method includes providing an electrical device with a first electrical connector. The method includes connecting the first electrical connector to a second electrical connector disposed on a connector board. The connector board is slidably mounted between first and second ends of a base. The method includes coupling the second connector to at least one signal through a cable. The second connector provides the at least one signal to the electrical device via the first connector. The method includes maintaining electrical connectivity between the at least one signal and the electrical device via the first and second connectors. The electrical connectivity is maintained throughout translation of the electrical device and the connector board between the first and second ends of the base.

In an exemplary embodiment, the electrical device is a printer and the method includes maintaining the printer operability throughout translation of the printer between the first and second ends of the base. The printer includes a printer paper holder and the method includes maintaining the electrical connectivity as paper is being loaded into the paper holder. The method includes fixing the connector board proximate the first end of the base responsive to removal of the electrical device. The first electrical connector is alignable with the second electrical connector. In another exemplary embodiment, the method includes maintaining electrical connectivity between the electrical device and an electronic gaming machine through the cable throughout translation of the electrical device along the base between the first and second ends. The cable is configured to furl and unfurl responsive to translation of the connector board. The first electrical connector and the second electrical connector are maintained in connection throughout translation of the connector board along the base. In another exemplary embodiment, the electrical device is the printer of a gaming machine.

BRIEF DESCRIPTION OF THE DRAWINGS

Referring now to the figures, wherein like elements are numbered alike.

DETAILED DESCRIPTION

Persons of ordinary skill in the art will realize that the following description of the present disclosure is illustrative only and not in any way limiting. Other embodiments of the invention will readily suggest themselves to such skilled persons having the benefit of this disclosure.

Accordingly, the present invention will be described in connection with a sliding drawer printer, although it should be understood that this is by way of example only, and virtually any other type of printer or electronic device may be used in implementing the invention.

In an exemplary embodiment, the apparatus for maintaining an electrical connection to a withdrawn electrical device is a sliding drawer printer. The sliding drawer printer (electrical device) includes a sliding drawer housing adapted for a cabinet and configured to restrict access to a printer disposed on a drawer demountably coupled to the sliding drawer housing. The sliding drawer housing includes a housing front end and a housing rear end. The housing rear end is opposite the housing front end. A base is formed in the sliding drawer housing. The base extends from the housing front end to the housing rear end. An electronics board is coupled to the sliding drawer housing proximate the housing rear end. A connector board is coupled to a slider bracket slidably coupled to the base. The slider bracket is configured to translate between the housing rear end and the housing front end. A connector cable is coupled to the electronics board and the connector board. The connector cable is configured to maintain electrical connectivity between the electronics board and the connector board throughout translation of the drawer between the housing rear end and the housing front end. A control board is operatively associated with the printer. The control board is configured to demountably couple with the connector board. The control board is also configured to electrically connect the electronics board with the printer throughout the translation of the drawer.

Figure 1:
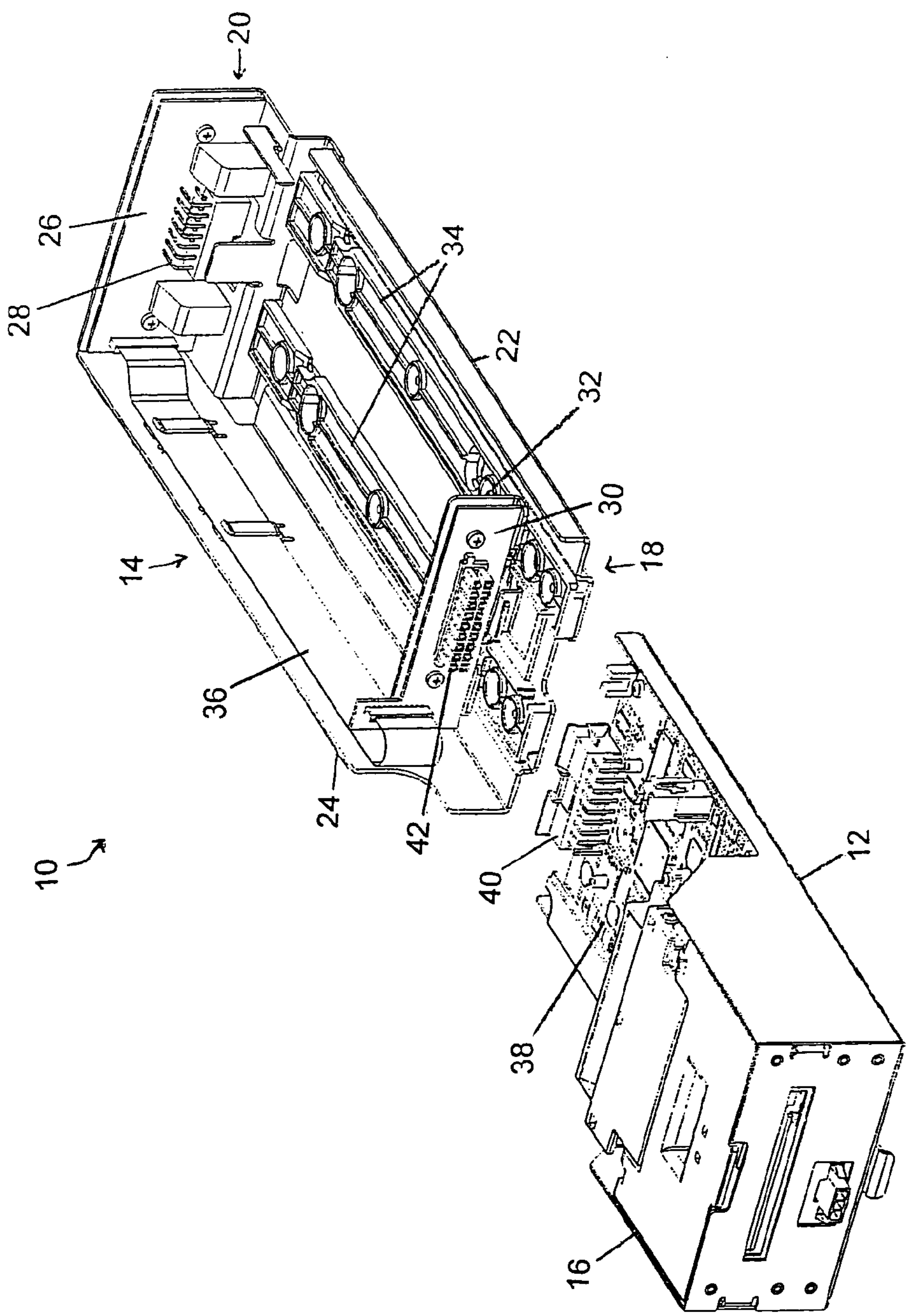
FIG. 1 is a perspective view of an exemplary sliding drawer printer with the printer removed from the housing.
Figure 2:
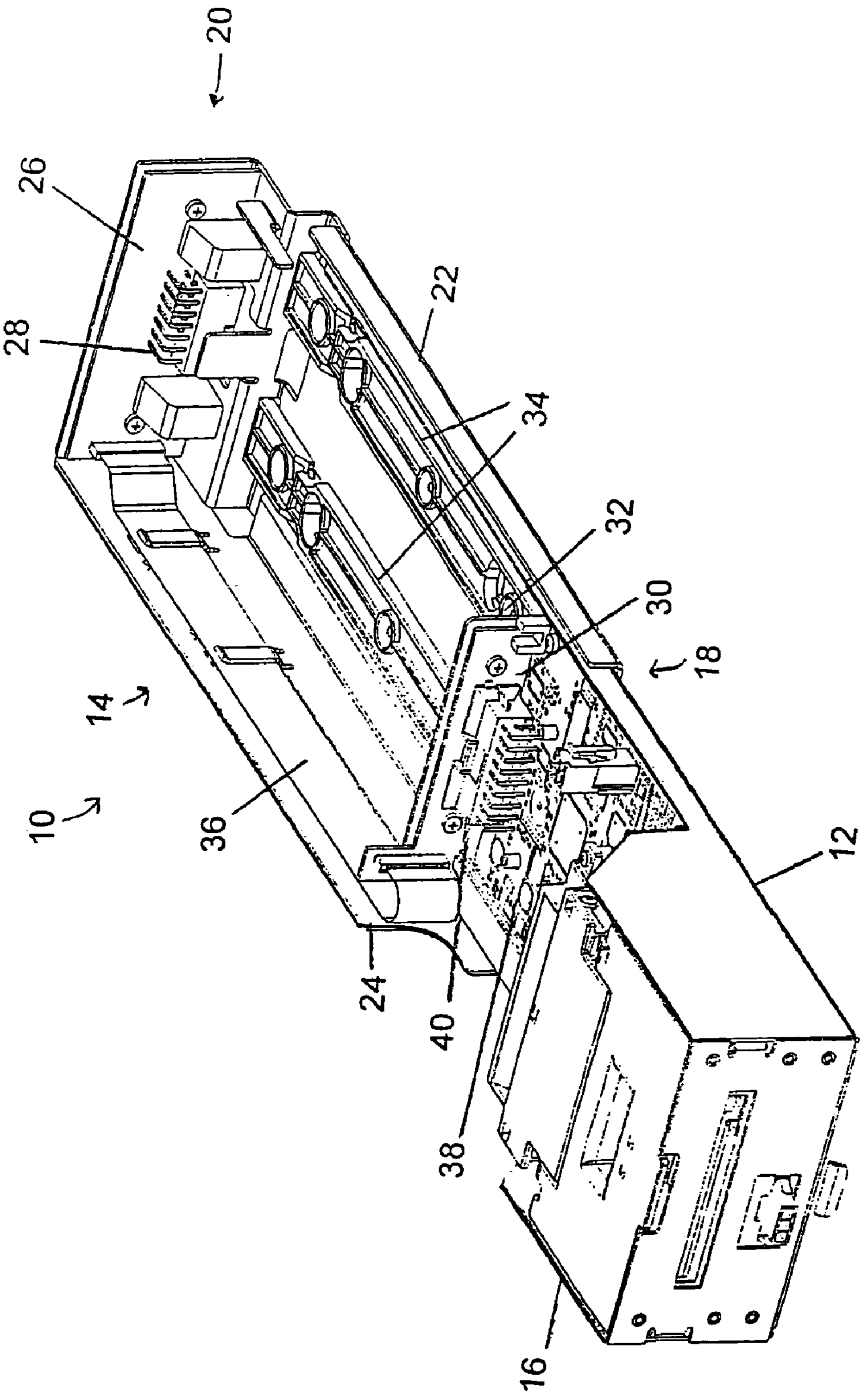
FIG. 2 is a perspective view of an exemplary sliding drawer printer with the printer partially removed from the housing.
Figure 3:
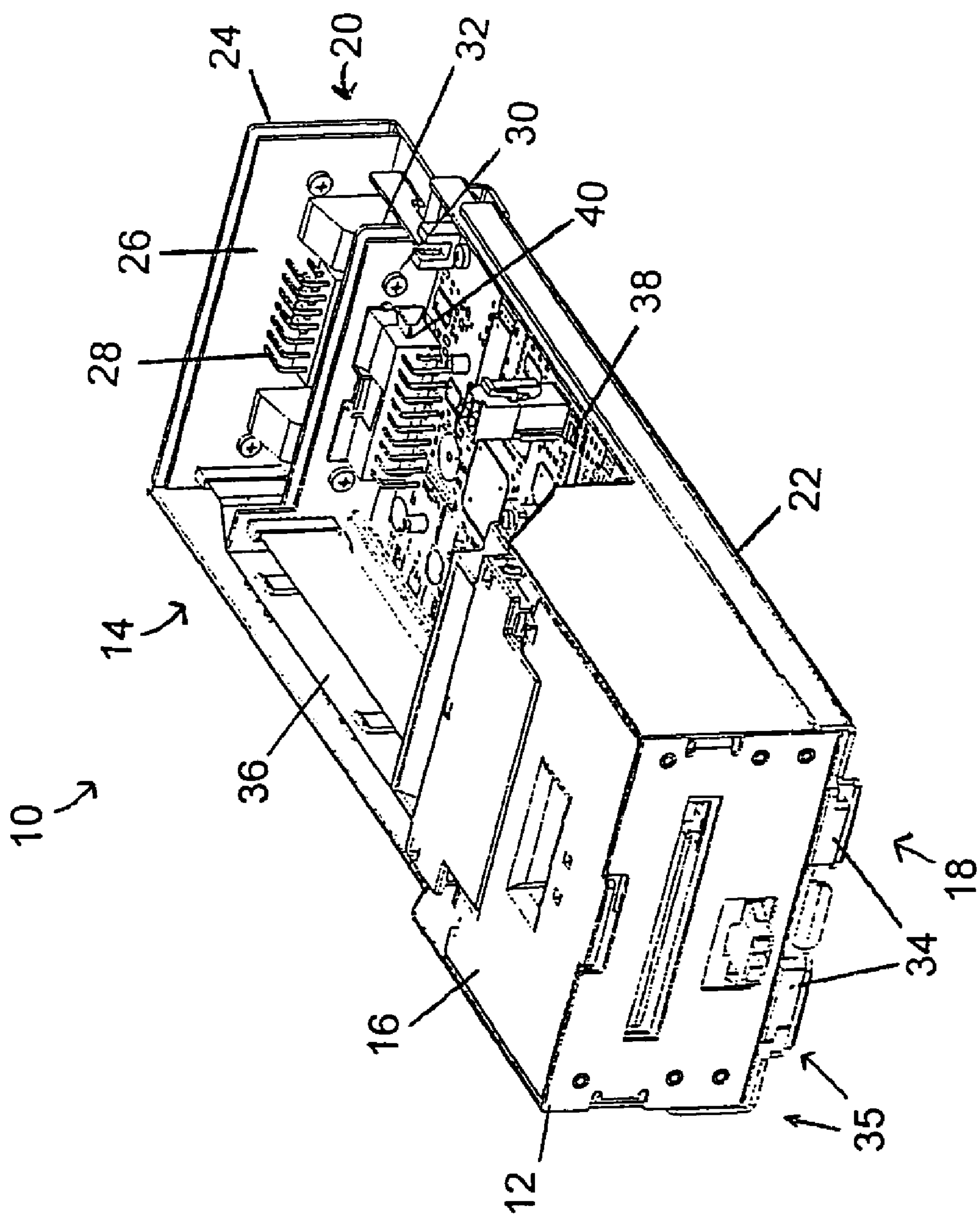
FIG. 3 is a perspective view of an exemplary sliding drawer printer with the printer inserted into the housing.

Referring to FIGS. 1–3, perspective views are illustrated of an exemplary sliding drawer printer 10. The sliding drawer printer 10 is shown in FIG. 1 with a drawer 12 withdrawn and removed from a sliding drawer housing 14. The drawer 12 includes a printer 16 disposed on the drawer 12. For clarity, a paper tray (not shown) is not included in the drawings, although it is a component normally included with the printer 16. With the paper tray removed from the drawing, components can be visualized to better describe the disclosed invention.

The sliding drawer housing 14 is adapted for a cabinet (e.g., a gaming machine cabinet-not shown). The sliding drawer housing 14 is configured to be mounted in the cabinet such that access to the printer 16 is restricted. In an exemplary embodiment, the printer 16 can comprise a gaming machine printer and the cabinet can be the cabinet for the gaming machine. Preventing access to the printer in the gaming machine is a priority. Enabling the printer 16 to be accessed for maintenance without completely removing the printer from the cabinet of the gaming machine is a benefit. In addition, enabling the printer 16 to remain electrically connected to the gaming machine while being maintained is an added advantage. The sliding drawer housing 14 includes a housing front end 18 and a housing rear end 20. The housing rear end 20 is opposite the housing front end 18, in a preferred embodiment. The sliding drawer housing 14 includes a base 22. The base 22 extends from the housing front end 18 to the housing rear end 20. The base 22 supports side walls 24 formed in the sliding drawer housing 14. The base 22 also supports an electronics board 26 coupled to the sliding drawer housing 14.

In a preferred exemplary embodiment, the electronics board 26 is coupled to the base 22 proximate the housing rear end 20. The electronics board 26 includes at least one signal line 28. In an exemplary embodiment, the signal line 28 can carry printer commands, instructions, control signals, electrical power, data, and the like. The electronics board 26 can be in operative communication with the gaming machine (not shown) or other devices providing a signal.

A connector board 30 is connected to the base 22 such that the connector board 30 can slide or translate between the housing front end 18 and the housing rear end 20. In an exemplary embodiment, the connector board 30 is coupled to a slider bracket 32. The slider bracket 32 is coupled to the base 22 such that the slider bracket 32 can slide along the base 22 on slide rails 34 between the housing front end 18 and the housing rear end 20. Two slide rails 34 can be mounted to the base 22 and configured to support the slider bracket 32. The slide rails 34 can also function as a receiver 35 that allows for support of the drawer 12 along the base 22. In another embodiment, the base 22 can include surface features that enable the drawer 22 to be slidably supported in the sliding drawer housing 14.

A connector cable 36 is coupled to the electronics board 26 and the connector board 30. The connector cable 36 is configured to maintain electrical connectivity between the electronics board 26 and the connector board 30. The connector cable 36 comprises a flexible electrical conduit, such as a ribbon cable. The connector cable 36 can extend from the housing front end 18 to the housing rear end 20. The connector cable 36 is configured to furl and unfurl responsive to the translation of the connector board 30 along the base 22. As the connector board 30 slides between the housing rear end 20 and the housing front end 18 the connector cable 36 flexibly maintains electrical connectivity between the connector board 30 and the electronics board 26. The connector cable 36 allows for the connector board 30 to be positioned at any location along the base 22 and connect to the electronics board 26 while maintaining the electric coupling and the communication of the signals between the electronics board 26 and the connector board 30. The connector cable 36 can be disposed proximate the base 22, proximate the side walls 24 and in any location of the sliding drawer housing 14 that allows the connector cable 36 to maintain the electrical connectivity. The connector cable 36 can couple to the connector board 30 and the electronics board 26 by various connector means, such as pin connectors and the like.

A control board 38 is operatively associated with the printer 16. The control board 38 is configured to demountably couple with the connector board 30. The control board 38 is configured to control the printer 16 via signals received from the electronics board 26 via the connector board 30 and connector cable 36. In an exemplary embodiment, the control board 38, the connector board 30, and the electronics board 26 can be printed circuit boards.

The control board 38 includes a control board electrical connector 40 configured to couple and decouple with a connector board connector 42 mounted on the connector board 30. The control board electrical connector 40 and the connector board electrical connector 42 can comprise any connecting means, such as pin connectors, and the like. The connector board electrical connector 42 and the control board electrical connector 40 allow for the printer to partially translate between a first position in the sliding drawer housing 14 (e.g., proximate the housing rear end as shown in FIG. 3) and a second position partially withdrawn from in the sliding drawer housing 14 (e.g., proximate the housing front end as shown in FIG. 2) and maintain electrical connectivity. The printer 16 can remain operable throughout the translation of the drawer 12 along the base 22. The connector board electrical connector 42 and the control board electrical connector 40 also maintain connectivity until the printer 16 translates along the sliding drawer housing 14 and is completely removed from the sliding drawer housing 14, at which time the connector board electrical connector 42 and the control board electrical connector 40 disconnect as seen in FIG. 1. The printer 16 can be reinserted into the sliding drawer housing 14 and reconnected to the electronics board 26 via the connector board electrical connector 42 and the control board electrical connector 40. The connector board electrical connector 42 and the control board electrical connector 40 can be aligned into electrical connection upon insertion of the printer 16 into the sliding drawer housing 14.

Figure 4:
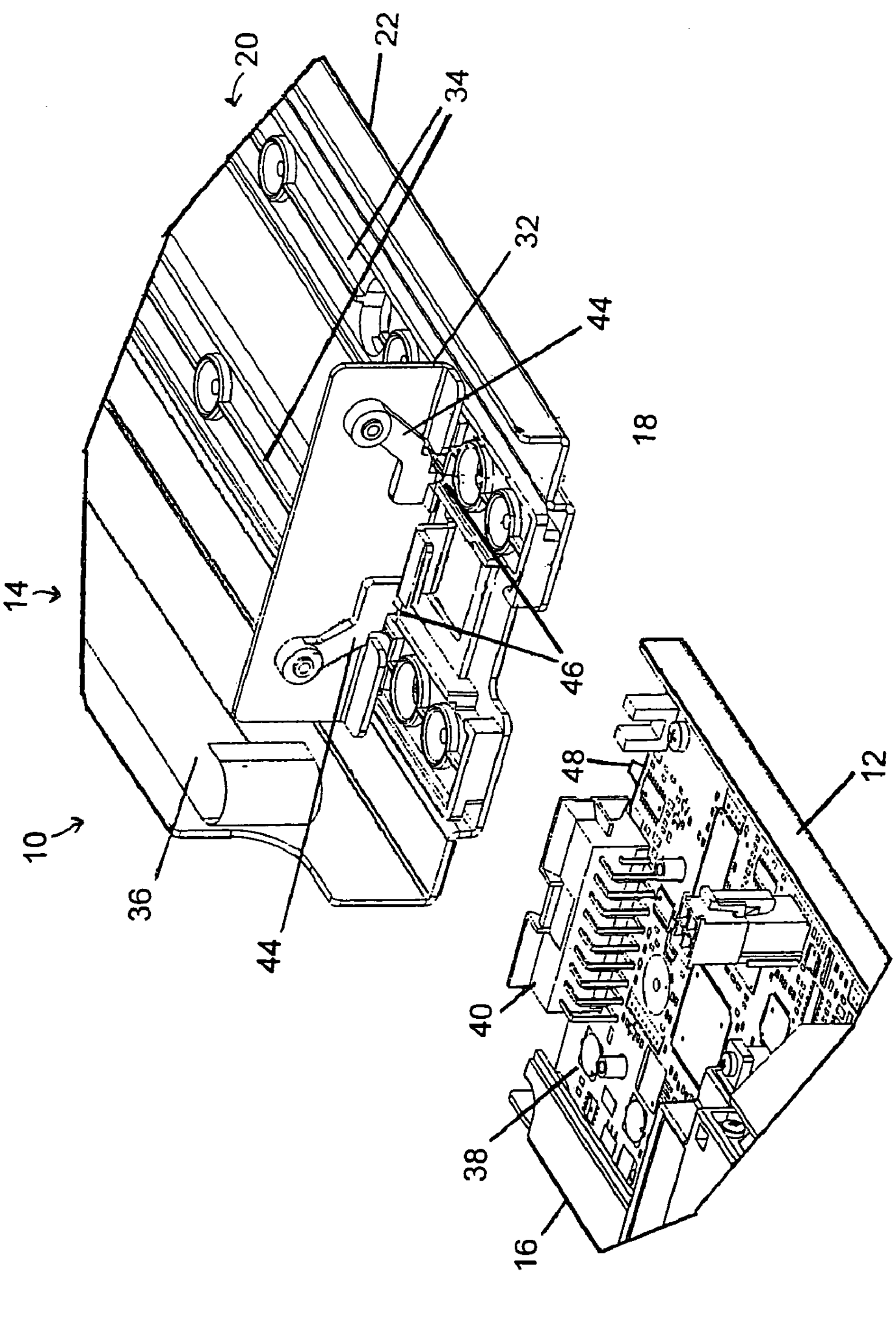
FIG. 4 is a partial perspective view of an exemplary sliding drawer printer with the printer removed from the housing.

Referring to FIG. 4, in an exemplary embodiment, a bracket latch 44 can be coupled to the slider bracket 32. The bracket latch 44 is configured to couple to the base 22 in order to temporarily fix and align the slider bracket 32 relative to the base 22 proximate the housing front end 18. The bracket latch 44 ensures that the control board electrical connector 40 and the connector board 30, and hence the connector board electrical connector 42 (FIG. 1) are properly aligned upon reinsertion of the printer 16 into the sliding drawer housing 14. For illustration purposes the connector board 30 is not shown in FIG. 4. The slider bracket 32 and associated connector board 30 are prevented from sliding along the base 22 after the printer 16 has been completely removed from the sliding drawer housing 14. Fixing the slider bracket 32 proximate the housing front end 18, after removal of the printer 16, also protects the connector cable 36 from damage due to contact with the drawer 12 and/or printer 16 upon reinsertion. In a preferred embodiment, the bracket latch 44 can couple to a notch 46 formed in the slide rail 34. In a preferred embodiment, a pair of bracket latches 44 is coupled to the slider bracket 32 and interfaces with the notches 46 formed in the slide rails 34. The bracket latch 44 can be decoupled from the notch 46 by a tab 48 formed in the drawer 12. The tab 48 can be configured to slide under the bracket latch 44 and lift the bracket latch 44 out of the notch 46, allowing the slider bracket 32 to slide along the slide rails 34 toward the housing rear end 20. It is contemplated that other decoupling means can be provided and function similarly to the tab 48. A tab 48 can be provided for each bracket latch 44.

In an exemplary embodiment, the configuration of the sliding drawer printer 10 allows for the drawer 12 to be operably connected and situated in the sliding drawer housing 14 (see FIG. 3). The drawer 12 can be pulled out, translating along the base to a partially withdrawn position (see FIG. 2). Printer paper can be loaded into the printer 16. The printer 16 does not have to be electrically disconnected from the electronics board 26 during this procedure. The printer 16 can maintain electrical connectivity with the electronics board 26 and a gaming machine connected thereto. The printer 16 can be slid back into the sliding drawer housing 14, wherein access to the printer 16 is restricted. The printer 16 maintains electrical connectivity due in part to the flexible connector cable 36 being connected between the electronics board 26 and the translatable connector board 30. The connector board 30 is configured to translate along the base between the housing rear end 20 and the housing front end 18 while remaining connected to the control board 38 of the printer 16.

It is contemplated that the printer 16 can be substituted with other electronic devices (not shown) and the sliding drawer housing 14 can be insertable into the cabinet of other types of devices.

The disclosed apparatus for maintaining an electrical connection to a withdrawn electrical device has the advantage of maintaining the operability of the electrical device during partial removal of the electrical device from a cabinet. The disclosed apparatus provides for continuous signal connectivity between the electrical device and a device in operation in the cabinet. Maintenance procedures can be performed on the electrical device without the need to electrically disconnect the electrical device. If the electrical device requires removal, the disclosed apparatus provides for complete removal of the electrical device and for easy reinsertion of the electrical device into the cabinet. The disclosed apparatus ensures the proper alignment of the electrical connectors between the printer control electrical connector and the connector board electrical connector. The connector board of the disclosed apparatus is fixed into a proper location by latching means in order to ensure the proper alignment upon reinsertion of the printer. The connector cable is also better protected from damage by the insertion of the printer.

While embodiments and applications of this disclosure have been shown and described, it would be apparent to those skilled in the art that many more modifications than mentioned above are possible without departing from the inventive concepts herein. The disclosure, therefore, is not to be restricted except in the spirit of the appended claims.

What is claimed is:

1. Apparatus for connecting a host device and a printer comprising:

- a printer slidably disposed on a base for movement between a first end and a second end of said base, said printer including a first electrical connector;
- a connector board slidably disposed on said base, said connector board including a second electrical connector configured to mate with said first electrical connector; and
- a cable electrically coupling said second connector to at least one signal, said cable being configured to maintain electrical connectivity between said at least one signal and said second connector as said connector board slides between said first end and said second end;

wherein:

- said printer is adapted to removably connect to said connector board via said first and second connectors,
  - said connector board is configured to slide along with said printer to provide electrical connectivity of said at least one signal to said printer as said printer slides between said first and second ends; and
- said first electrical connector and said second electrical connector are configured to enable disconnection and reconnection of said first and second electrical connectors while power is supplied to said second electrical connector without causing a fault or error in said host device.

2. The apparatus of claim 1 wherein said printer is partially removable from said base and configured to maintain electrical connectivity with said at least one signal.

3. The apparatus of claim 1 wherein said connector board is coupled to a slider bracket, said slider bracket being configured to slidably translate along said base between said first end and said second end along a bracket slot formed in said base.

4. The apparatus of claim 1 wherein said printer is configured to align said first electrical connector into electrical connection with said second electrical connector.

5. The apparatus of claim 1 wherein said printer is configured to partially translate and be partially withdrawn from said base exposing components coupled to said printer and to maintain electrical connectivity between said printer and said at least one signal.

6. The apparatus of claim 1 wherein said base includes a receiver extending between said first end and said second end of said base, said receiver configured to receive said printer and support translation of said printer.

7. The apparatus of claim 1 wherein said cable comprises a flexible cable proximate said base.

8. The apparatus of claim 1 wherein said cable is extendable from said first end to said second end.

9. The apparatus of claim 1 wherein said at least one signal comprises one of electrical power and control signals for the printer.

10. The apparatus of claim 9 wherein said printer is a gaming device printer.

11. A method for connecting a host device and a printer comprising:

- providing a printer with a first electrical connector;
- connecting said first electrical connector to a second electrical connector disposed on a connector board slidably mounted between first and second ends of a base;

coupling said second connector to at least one signal through a cable, said second connector providing said at least one signal to said printer via said first connector; and maintaining electrical connectivity between said at least one signal and said printer via said first and second connectors throughout translation of said printer and connector board between said first and second ends of the base;

wherein said first electrical connector and said second electrical connector are configured to enable disconnection and reconnection of said first and second electrical connectors while power is supplied to said second electrical connector without causing a fault or error in said host device.

12. The method of claim 11 wherein further comprising:

maintaining said printer operability throughout translation of said printer between said first and second ends of the base.

13. The method of claim 12 wherein said printer includes a printer paper holder, said method further comprising:

fixing said connector board proximate said first end of said base responsive to removal of said printer, wherein said first electrical connector is alignable with said second electrical connector.

14. The method of claim 11 further comprising:

maintaining electrical connectivity between said printer and the host device through said cable throughout translation of said printer along said base between said first and second ends.

15. The method of claim 11 wherein said cable is configured to furl and unfurl responsive to translation of said connector board.

16. The method of claim 11 wherein said first electrical connector and said second electrical connector are maintained in connection throughout translation of said connector board along said base.

17. The method of claim 11, wherein said host device comprises a gaming machine.

18. A sliding drawer printer comprising:

a sliding drawer housing adapted for a cabinet of a host device, said cabinet configured to restrict access to a printer disposed on a drawer demountably coupled to said sliding drawer housing, said sliding drawer housing including a housing front end and a housing rear end opposite thereof, a base formed in said sliding drawer housing extending from said housing front end to said housing rear end;

an electronics board coupled to said sliding drawer housing proximate said housing rear end;

a connector board coupled to a slider bracket slidably coupled to said base and configured to translate between said housing rear end and said housing front end;

a connector cable coupled to said electronics board and said connector board, said connector cable configured to maintain electrical connectivity between said electronics board and said connector board throughout translation of said drawer between said housing rear end and said housing front end; and a control board operatively associated with said printer, said control board configured to demountably couple with said connector board and electrically connect said electronics board with said printer throughout said translation of said drawer;

wherein said control board and said connector board are configured to enable disconnection and reconnection of said control board and said connector board while power is supplied to said connector board without causing a fault or error in the host device.

19. The sliding drawer printer of claim 18 wherein said base includes slide rails mounted in said base, said slide rails configured to support translation of said slider bracket.

20. The sliding drawer printer of claim 18 wherein said drawer is configured to translate distally from said housing rear end exposing said printer for access while maintaining electrical connectivity between said printer and said electronics board.

21. The sliding drawer printer of claim 18 wherein said printer is accessible for at least one of insertion of paper and removal of paper while maintaining electrical connectivity between said printer and said electronics board.

22. The sliding drawer printer of claim 18 wherein said electronics board communicates electrical power and control signals between said printer and said host device, said host device comprising a gaming machine.

23. The sliding drawer printer of claim 18 wherein said drawer is configured to completely decouple from said sliding drawer housing.

24. The sliding drawer printer of claim 18 further comprising:

at least one bracket latch configured to demountably couple said slider bracket to said base for alignment of said connector board and said control board responsive to reinsertion of said printer into said sliding drawer housing.

* * * * *